(12) United States Patent
Kim et al.

(10) Patent No.: US 7,796,479 B2
(45) Date of Patent: Sep. 14, 2010

(54) REDUCED NOISE SERVO CONTROL

(75) Inventors: Soo-Yong Kim, Suwon-si (KR); Jae-Hyun Ahn, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 363 days.

(21) Appl. No.: 12/044,058

(22) Filed: Mar. 7, 2008

(65) Prior Publication Data
US 2009/0067298 A1   Mar. 12, 2009

(30) Foreign Application Priority Data
Sep. 7, 2007   (KR) .................... 10-2007-0091226

(51) Int. Cl.
*G11B 7/00* (2006.01)

(52) U.S. Cl. ............... 369/44.32; 369/47.38; 369/47.17

(58) Field of Classification Search ............. 369/44.28, 369/44.29, 44.34, 44.32, 53.34, 53.28, 53.23, 369/47.5, 47.44, 47.38, 47.36, 47.18
See application file for complete search history.

(56) References Cited

U.S. PATENT DOCUMENTS 6,922,381 B2 *   7/2005   Shidara ................... 369/44.32

\* cited by examiner

*Primary Examiner*—Nabil Z Hindi
(74) *Attorney, Agent, or Firm*—F. Chau & Associates, LLC

(57) ABSTRACT

A servo control system and method is provided, comprising: a controller outputting a parameter control signal; a device having a parameter controlled based on the parameter control signal; a sensing circuit sensing the parameter of the device and generating a parameter error signal; a sinusoidal signal generator generating a sinusoidal signal; and a adder combining the parameter error signal and the sinusoidal signal, wherein the controller includes a servo equalizer that equalizes the added parameter error signal and the sinusoidal signal to output an equalized parameter control signal to adjust the parameter.

25 Claims, 7 Drawing Sheets

REDUCED NOISE SERVO CONTROL

This application claims priority under 35 USC Section 119 to Korean application KR2007-0091226, filed on Sep. 7, 2007, the disclosure of which is incorporated by reference herein.

TECHNICAL FIELD

The present invention relates generally to control systems; more particularly, to a reduced noise servo control apparatus and method.

DISCUSSION OF RELATED ART

A servomechanism, or servo, is a device used to provide control of a desired operation through the use of feedback. Servos are commonly electrical or partially electronic in nature, using an electric motor as the primary means of creating mechanical force. Usually, servos operate on the principle of negative feedback, where the control input is compared to the actual position of the mechanical system as measured by some sort of transducer at the output. Any difference between the actual and wanted values (an "error signal") is amplified and used to drive the system in the direction necessary to reduce or eliminate the error. Servos are widely used in industry, manufacture, and in homes. For example, robots under servo control are employed in assembly lines in factories. At home, servo control is employed to control a furnace to heat to a thermostat setting. Servos are used in home appliances, such as CD and DVD players/recorders, disk drives in a computer, etc.

As an illustration, in a CD player a drive motor spins the disc. This drive motor is precisely controlled to rotate between 200 and 500 rpm depending on which track is being read. A laser and a lens system focus in on and read the data at the target location on the track. A tracking mechanism under servo control moves the laser assembly so that the laser's beam can follow the spiral track. The tracking mechanism has to be able to move the laser at very fine resolutions. Noise that may be present in the servo control signal can cause erroneous read of data at the target location or at a wrong location, causing malfunction in the CD player operation.

The same tracking mechanism used in a CD or DVD player can also be used to laser-etch labels, texts, and designs on the opposite side of a CD or DVD disc. The servo control circuit used in reading or writing the CD/DVD can be used to position the laser to etch the desired text or graphics. The surface of the disc to be labeled is coated with a reactive dye that changes color when it absorbs infrared laser light. Typically, the surface of the disc to be labeled has a shiny and light reflective surface, and light impinged upon the surface is reflected and an even greater amount of noise is introduced in the servo control mechanism.

In any servo mechanism used to control actuators with a high degree of precision, reduction of noise to enhance the signal to noise ratio of the control signal is necessary. Numerous noise reduction techniques have been taught in engineering classes and explained in texts. Which technique may be effective depends largely on the nature of the signal to be processed and the type of noise that may be prevalent in the system at hand.

FIG. 1 shows examples of four different noise spectra that may be present in electronic systems: (a) low-frequency noise from 0-1000 Hz, (b) low-frequency noise from 0-5000 Hz, (c) broadband noise between 2500-5000 Hz, (d) narrow-band noise between 4700-5300 Hz. In the oscilloscope traces each horizontal unit corresponds to 1 ms. The noise strengths, or mean-square noise amplitudes, are approximately equal in all four situations.

All electronic systems contain some form of white noise, but many practical systems employing large scale integrated circuits, such as servo systems used in CD or DVD recorder/players are also plagued by additional low-frequency noise components wherein the noise spectral density increases as the inverse frequency. This low frequency noise component is commonly referred to as "1/f noise".

FIG. 2 shows time traces of spectrally white noise, and 1/f noise. FIG. 2A shows the added noise spectrum and FIG. 2B shows the signal spectrum. A much stronger presence of the low-frequency components in the 1/f curve can be seen in FIG. 2A, i.e., 1/f noise is best specified via the transition frequency $f_k$, white noise dominates for frequencies above $f_k$, 1/f noise dominates below $f_k$.

There are numerous techniques in signal processing to remove or reduce noise in an electronic system. One technique is time averaging by line frequency filtering. However, for a system that has low frequency dominance of 1/f noise, low-frequency filtering does not work well. An increase of the measurement time in integration may average out some of the noise, but also makes the system more sensitive to noise at lower frequencies. Further, low frequency filtering affects phase margin and the stability of the servo loop.

Phase margin is the difference, measured in degrees, between the phase angle of the amplifier's output signal and −360°. In feedback amplifiers such as amplifiers used in a servo loop, the phase margin is measured at the frequency at which the open loop voltage gain of the amplifier and the closed loop voltage gain of the amplifier are equal. The output signals of all amplifiers exhibit a time delay when compared to their input signals. This delay is caused by internal resistances, current limits and capacitances within the amplifier. This delay causes a phase difference between the amplifier's input and output signals. If there are enough stages in the amplifier, at some frequency, the output signal will lag behind the input signal by one wavelength. The amplifier will be unstable and oscillate if the fed-back output signal lag acts to reinforce the input signal. In using low frequency filtering, extra lag is added to the servo loop, possibly adversely affecting the phase margin and stability of the servo loop.

The use of Multiple time averaging (MTA), which refers to a different way of averaging, to reduce noise may also be considered. In MTA, instead of taking a single long measurement, a series of short measurements are taken and the measurements are averaged afterwards. As the individual measurements are short MTA may be more effective in increasing the signal to noise ratio; however, multiple time averaging involves extra circuitry and processing overhead in addition to the added lag introduced into the servo loop.

The use of modulation techniques may also be considered to improve the signal-to-noise ratio. Signal modulation is a signal processing technique commonly used in telecommunication systems to shift a signal from DC (f=0) to any frequency, usually to avoid noise. A signal is modulated by multiplying the signal with a carrier wave having the target modulation frequency. Modulation techniques may be suitable for reducing noise in a servo system because the modulation frequency f can be selected to be sufficiently high to avoid 1/f noise, and far away from any frequencies of possible external perturbations. Modulation will reduce the signal strength but more so the noise because the signal is spread over harmonics of the modulation frequency. However, modulation by multiplication of the signal with a carrier wave, e.g., a sine wave, causes time delays and phase shifts which require tuning or the servo system can be rendered unstable.

Accordingly, a need exists for a servo control system that effectively reduces the noise present in the servo system without affecting the stability and operation of the device under control.

SUMMARY OF THE INVENTION

According to an aspect of the present invention, a method of servo control is provided, comprising: outputting at a controller a parameter control signal; adjusting a device using the control signal; sensing the parameter value of the device; outputting an error signal representing parameter error; generating a sinusoidal signal; combining the error signal with the sinusoidal signal; inputting the added error and sinusoidal signal to the controller; equalizing the added error and sinusoidal signal at the controller; and outputting the equalized signal as the parameter control signal. The step of equalizing includes performing a square law operation on the added error and sinusoidal signal.

According to another aspect of the invention, the method further includes low pass filtering the equalized signal. The sinusoidal signal is generated at a carrier frequency above 20 Khz and at a signal level below 150 mV. More preferably, the sinusoidal signal has a carrier frequency at about 40 Khz and at a signal level of about 100 mV.

According to another aspect of the invention, the positional control signal is used to control an optical pick up assembly of an optical disc player, or to control a disc access assembly of an HDD.

A servo control system is also provided, comprising: a controller outputting a parameter control signal; a device having a parameter controlled based on the parameter control signal; a sensing circuit sensing the parameter of the device and generating a parameter error signal; a sinusoidal signal generator generating a sinusoidal signal; and a adder combining the parameter error signal and the sinusoidal signal, wherein the controller includes a servo equalizer that equalizes the added parameter error signal and the sinusoidal signal to output an equalized parameter control signal to adjust the parameter.

Preferably, the parameter is one of position, laser power, tilt, velocity, acceleration, intensity, or duration.

According to another aspect of the invention, the device includes an actuator that adjusts the parameter, wherein the actuator has a frequency response of 3 db cutoff below 10 Khz. The sinusoidal signal is generated at a carrier frequency above 20 Khz and at a signal level below 150 mV; more preferably, the sinusoidal signal has a carrier frequency at about 40 Khz and at a signal level of about 100 mV.

According to another aspect of the invention, the equalizer includes a transistor device to effect a square law operation on the added parameter error signal and the sinusoidal signal. The device having a parameter under servo control is one of a CD-player, DVD-player, ROMROM, DVDROM, optical reader, or optical recorder. The servo control system according to an embodiment of the present invention may also be applicable to an HDD and the parameter to be control is the position of the disc to be accessed, or the device is a thermostat and the parameter is temperature, or the device is a DRAM and the parameter is refresh rate.

According to still another aspect of the invention, a servo control system for use in a data disc accessing device is provided, comprising: a controller outputting a positional control signal; a disc reading device that reads data from a disc; a tracking device that tracks the position of the disc reading device; an error generator that generates an error signal representing the difference between a target position and the tracked position of the disc reading device; a sinusoidal signal generator that generates a sinusoidal signal; and an adder that adds the parameter error signal and the sinusoidal signal, wherein the controller includes a servo equalizer that equalizes the added error signal and the sinusoidal signal to output an equalized positional control signal to adjust the position of the disc reading device.

According to this aspect of the invention, the equalizer includes a nonlinear device to provide a square-law effect to the added error signal and the sinusoidal signal. The data disc accessing device may be one of CD player, a CD recorder, a DVD player, a DVD recorder, or an HDD, or a CD/DVD recorder configured to etch designs onto a CD/DVD disc.

BRIEF DESCRIPTION OF THE DRAWINGS

Preferred embodiments of the present invention will be described below in more detail, with reference to the accompanying drawings:

FIG. 2A shows the add noise spectrum and FIG. 2B shows the signal spectrum.

DETAILED DESCRIPTION OF EXEMPLARY EMBODIMENTS

According to an exemplary embodiment of the present invention, a sinusoidal (hereafter referred to as either cosine or sine) wave signal is added to an error signal, then the combined signal is amplified in a nonlinear device to reduce noise that may be present in the servo system.

Figure 1:
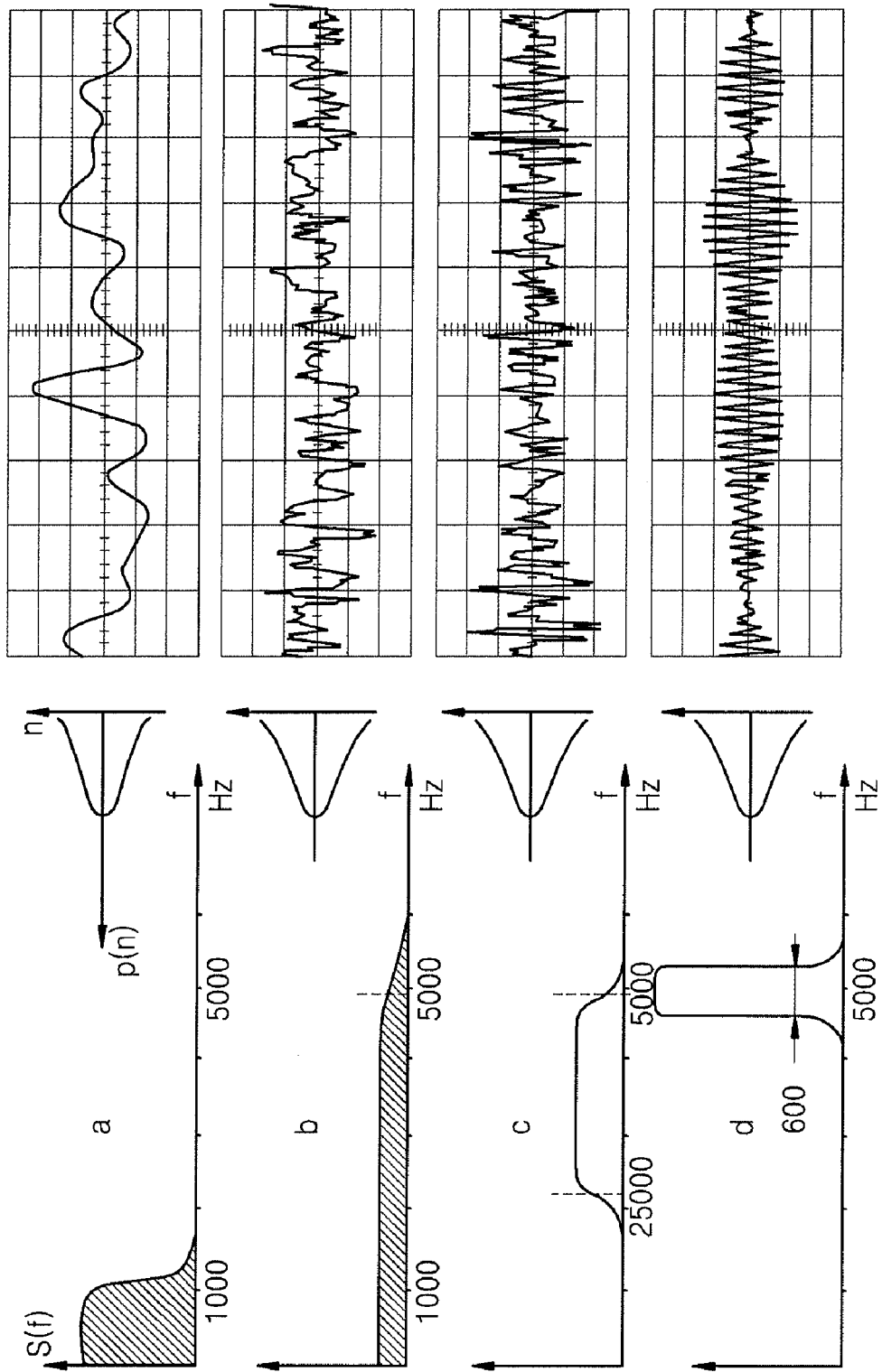
FIG. 1 shows examples of four different noise spectra: (a) low-frequency noise from 0-1000 Hz, (b) low-frequency noise from 0-5000 Hz, (c) broadband noise between 2500-5000 Hz, (d) narrow-band noise between 4700-5300 Hz. In the oscilloscope traces each horizontal unit corresponds to 1 ms.
Figure 2:
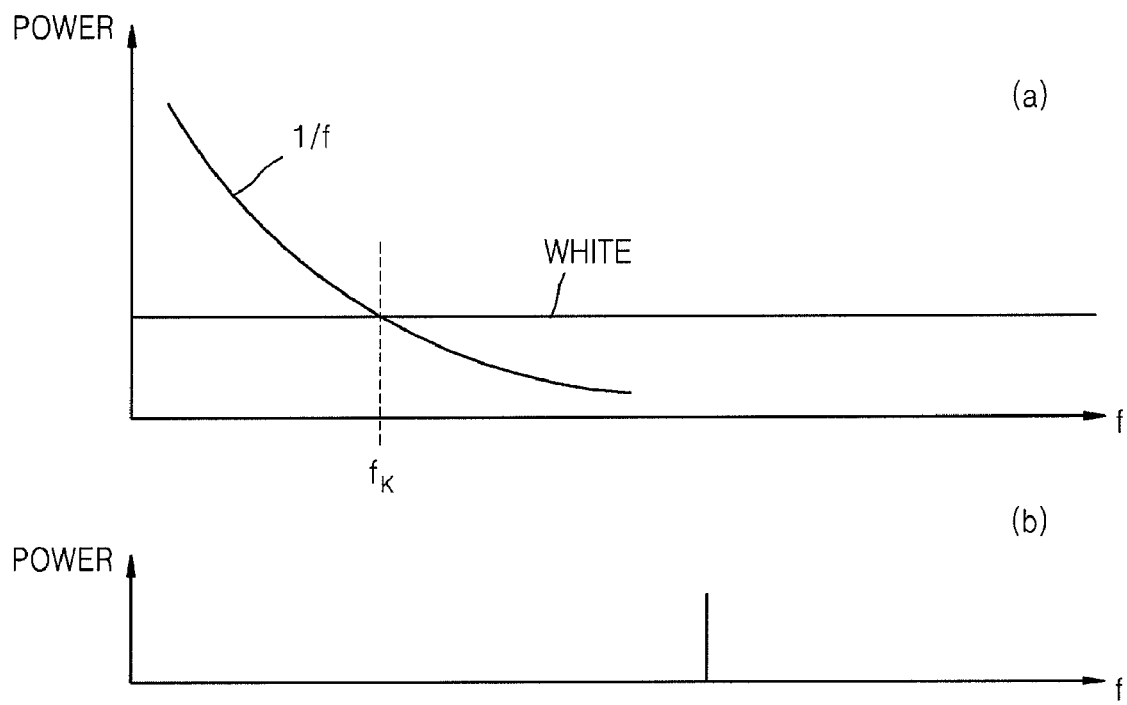
FIG. 2 shows time traces of spectrally white noise and 1/f noise.
Figure 3:
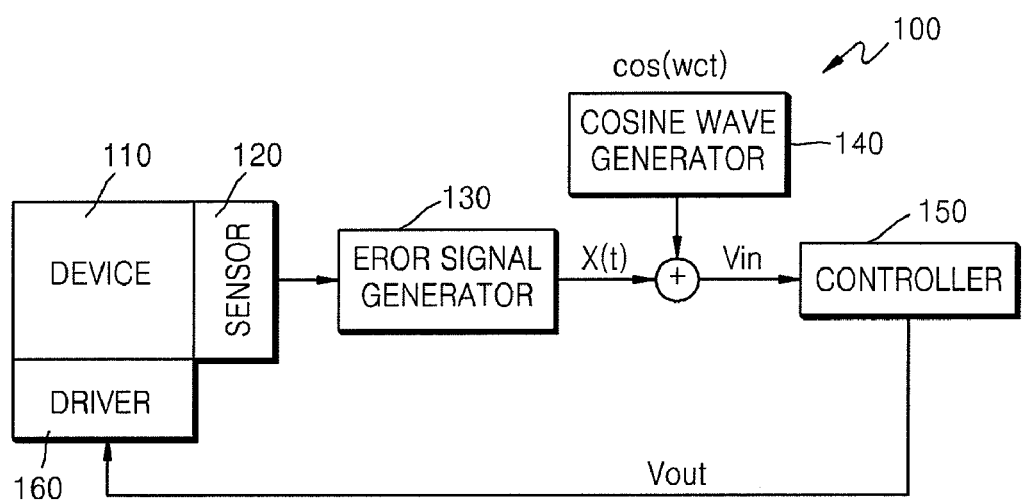
FIG. 3 shows a servo system according to an exemplary embodiment of the present invention.

FIG. 3 shows a servo system according to an exemplary embodiment of the present invention. A controller 150 having servo processing circuitry controls a parameter of device 110 by generating a parameter control signal to device driver 160 to drive the parameter of device 110. The target parameter is actuated by the drive signal from driver 160 to the target parameter value. The parameter value is monitored by sensor 120. An error signal generator 130 compares the target parameter value to the actual parameter value read from the device 110 and generates an error signal x(t), representing the difference between the two values. A wave generator 140 generates a sinusoidal signal, such as a cosine carrier signal cos(wct). According to this embodiment, the sinusoidal signal has a carrier frequency above about 20 Khz and has a signal level below about 150 mV. This carrier signal is added to the error signal x(t) output from the error signal generator 130 by adder 135. Vin is the composite error signal output from the adder 135 and input to the controller 150. The controller 150 processes the composite error signal Vin using a servo equalizer to remove the carrier signal and recover the error signal to output a feedback drive signal Vout. A servo equalizer according to at least one embodiment of the present invention includes an amplification element to provide gain and a nonlinear element to reduce noise in the servo system while equalizing the composite error signal. One ordinary skilled in the art appreciates that a transistor operating in amplification mode can provide both amplification and nonlinear functions. According to an embodiment of the present invention, the servo equalizer includes transistor elements (not shown) to provide gain and nonlinearity to perform noise reduction. The nonlinearity includes use of a square-law approximation of the composite error signal Vin. The square-law approximation can be expressed as:

$$v_{out} = a_1 v_{in} + a_2 v_{in}^2,$$ Equation [1]

$$v_{in}(t) = x(t) + \cos(w_c t)$$ Equation [2]

$$v_{out}(t) = a_1 x(t) + a_2 x^2(t) + a_2 \cos^2(\omega_c t) + a_1 \left[1 + \frac{2a_2}{a_1} x(t)\right] \cos(\omega_c t)$$ Equation [3]

wherein Vout is a combination of the linear amplification of Vin by gain $a_1$ plus a nonlinear amplification of Vin by gain $a_2$ [Equation 1], the nonlinear amplification producing a square law effect. Note that Vout in [Equation 3] becomes a combination of $a_1 x(t) + a_2 x^2(t)$ and other components which appear at the carrier frequency and harmonics of the carrier frequency. If the carrier frequency is set at a much higher frequency than the slowly varying error signal, Vout becomes $a_1 x(t) + a_2 x^2(t)$ at frequencies near zero.

Figure 4A:
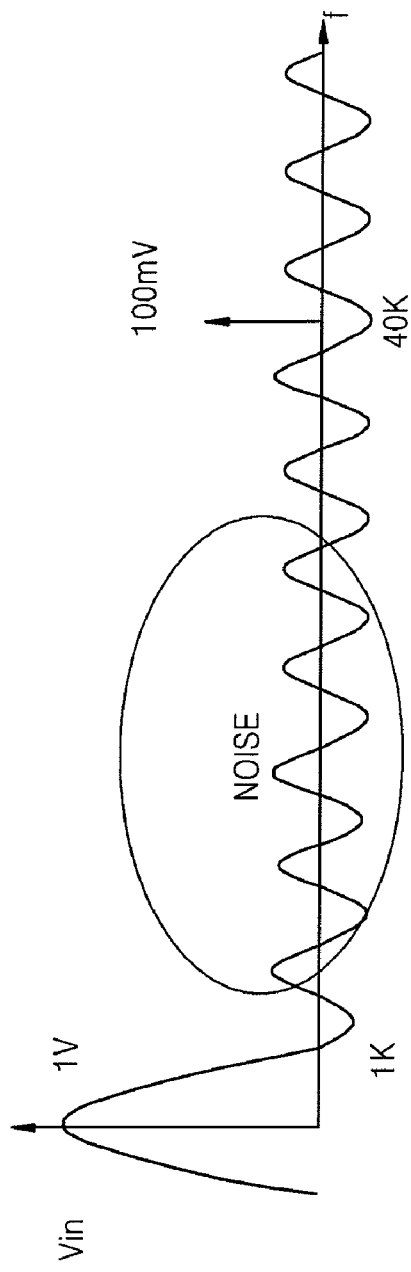
FIG. 4A shows an illustrative signal Vin to be input to a controller according to an embodiment of the present invention.

FIG. 4A shows an illustrative signal waveform of the composite error signal Vin according to an embodiment of the present invention. As shown, Vin has an error signal component at zero frequency of about 1V, a sinusoidal (carrier) signal component of about 100 mv at a carrier frequency of 40 Khz, and a noise signal at a reduced voltage level that is superimposed onto the error signal at lower frequencies and also exists at other frequencies.

Figure 4B:
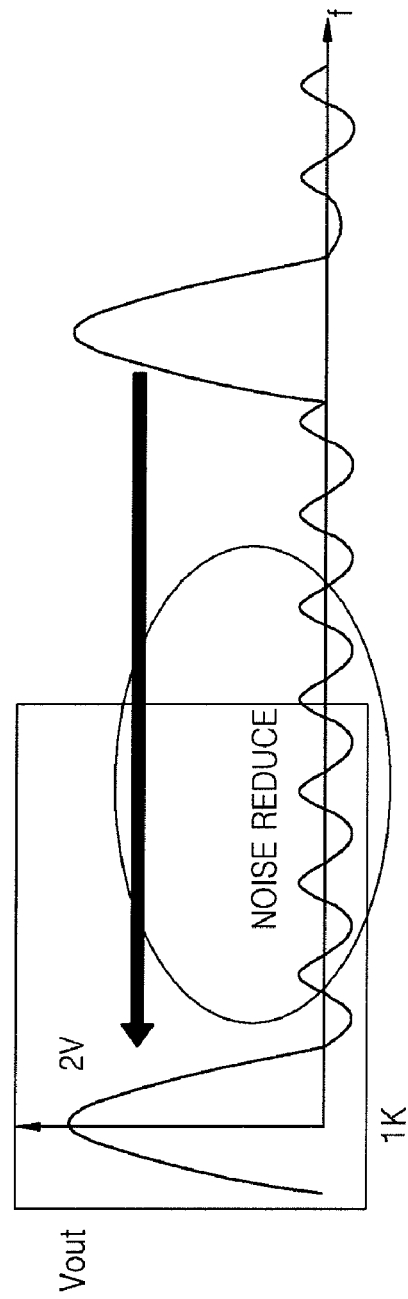
FIG. 4B shows the Vout signal output from the servo equalizer of the controller according to an embodiment of the present invention.

FIG. 4B shows the Vout signal output from the servo equalizer of the controller 150 upon processing the illustrative Vin signal of FIG. 4A. It can be seen that the error signal has been amplified by the combination gain factors $a_1$ and $a_2$ to reach up to 2V. An amplified version of the carrier signal appears at the carrier frequency of 40 Khz, and the amplitude of the noise signal will be reduced because the higher frequency components of the noise signal have been shifted to the carrier frequency and harmonics of the carrier frequency.

Referring again to FIG. 3, if driver 160 is an actuator which operates at a low frequency, such as at or below 10 Khz, the Vout signal seen by the actuator would be the error signal (at about 2V) and the reduced noise signal. According to an alternative embodiment of the present invention, a low pass filter (LPF), such as a filter that cuts off at or about 5 Khz, can be inserted between the controller 150 and the driver 160 to filter the higher frequency components from Vout. This alternative embodiment is contemplated when the driver or actuator is one which can operate at higher frequencies. It is noted that in addition to the reduced noise operation according to an exemplary servo system of the present invention, the introduction of the carrier wave signal cos(w_c t) by simple addition (instead of modulation by multiplication) does not alter the phase (nor the phase margin) of the servo system.

Figure 5:
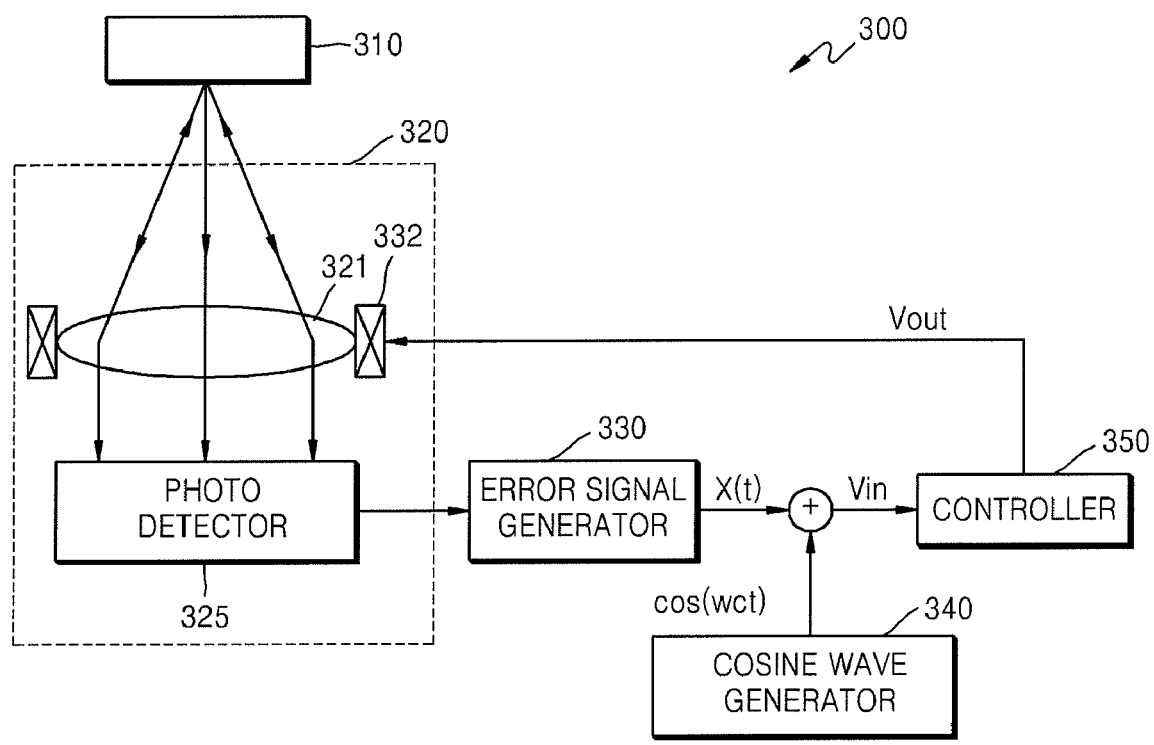
FIG. 5 shows a servo system of an embodiment of the present invention applied to a CD/DVD player.

FIG. 5 shows a servo system of an embodiment of the present invention applied to a CD/DVD player. The CD/DVD player 310 is read by pick up head 320, which includes an actuator 332 to position the laser and lens assembly 321. A photo detector 325 detects the information read from the disc. An error signal generator 330 receives the information detected from the photo detector 325 and generates an error signal x(t) representing the difference between the target position of the laser and lens assembly and the actual position read by the photo detector 325. A wave generator 340 generates a carrier wave signal, cos(w_c t), and this carrier signal is added at adder 345 to output Vin, which in turn is fed to controller 350. The controller 350 includes a servo equalizer having a nonlinear amplification device to produce a square law effect on signal Vin to output signal Vout, essentially as shown in FIG. 4B. Vout is sent from the controller 350 to actuator 332 to complete the servo loop.

While FIG. 5 shows an illustrative embodiment of a servo system according to the present invention applied to a CD/DVD player, one ordinarily skilled in the art can readily appreciate that such servo system can be applicable to numerous other servo systems, such as tracking servo, focus servo, and tilt servo. In each of these servo systems, a positional difference at the actuator 332 is detected by the photo detector 325. In an embodiment of the present invention using a focus servo, the photo detector detects a positional difference between the focus position of the light beam and a selected recording surface of a plural layered disc.

Figure 6:
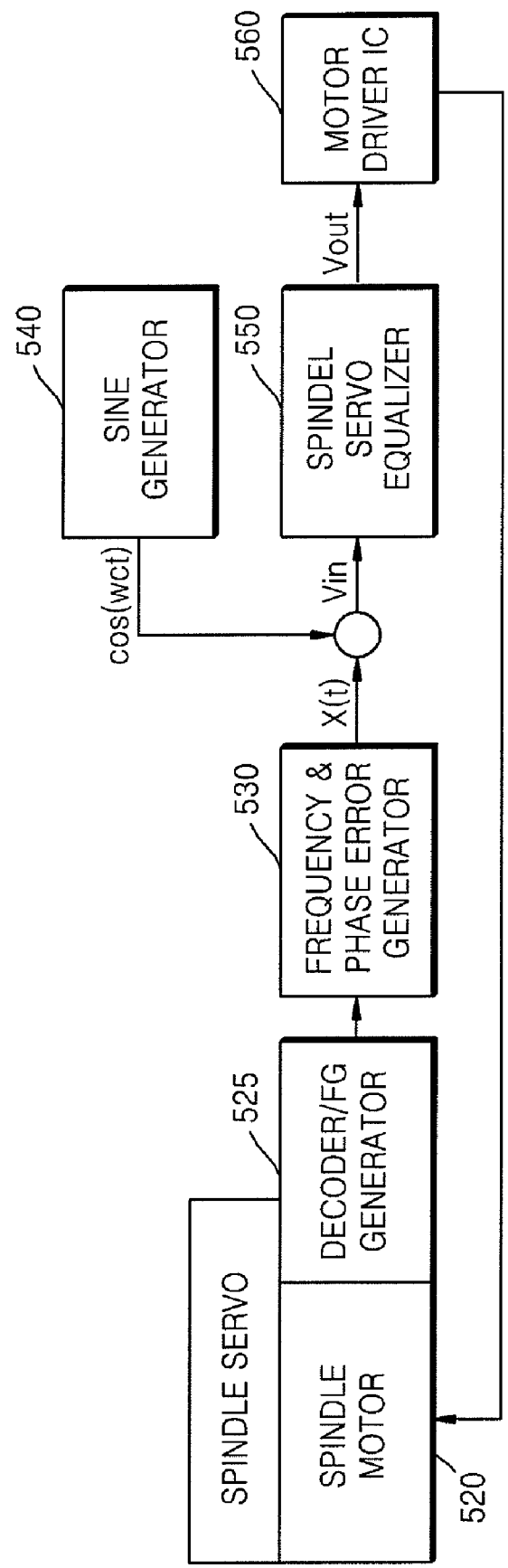
FIG. 6 shows a spindle servo system according to an embodiment of the present invention.

FIG. 6 shows an illustrative embodiment of a spindle servo system according to the present invention. A spindle servo subsystem employs a spindle motor 520 to rotate a disc and the speed of rotation is controlled using the spindle servo system by comparing the actual speed of rotation with a motor reference frequency. A decoder 525 is used to detect the acceleration of the spindle motor. A frequency and phase error generator 530 compares the detected acceleration value with the selected acceleration value and generates an error signal, which is added to a sine wave generated by a sine wave generator 540. The sum of the sine wave and the error signal, Vin, is equalized by equalizer 550, having a nonlinear amplification device to produce a square law effect on signal Vin to output signal Vout, essentially as described and shown above with Equations 1 to 3. The motor driver IC 560 issues an acceleration command to the spindle motor 520 based on the equalized signal Vout. The motor reference frequency can be derived from a subcarrier frequency, which can also be used to correct for time base errors. By utilizing the subcarrier frequency as the source of the motor reference signal, the spindle motor itself removes all fixed time base errors which arise from a mismatching of the recording speed with the playback speed. Similarly, the recording speed can also be controlled by the subcarrier frequency. The use of a single highly controlled frequency in both the recording mode and the reading back mode removes the major portion of time base error. While the subcarrier frequency is shown as the preferred source in generating the motor reference frequency, other highly controlled frequency signals can be used in controlling the writing and reading of frequency modulated video signal on the disc.

Figure 7:
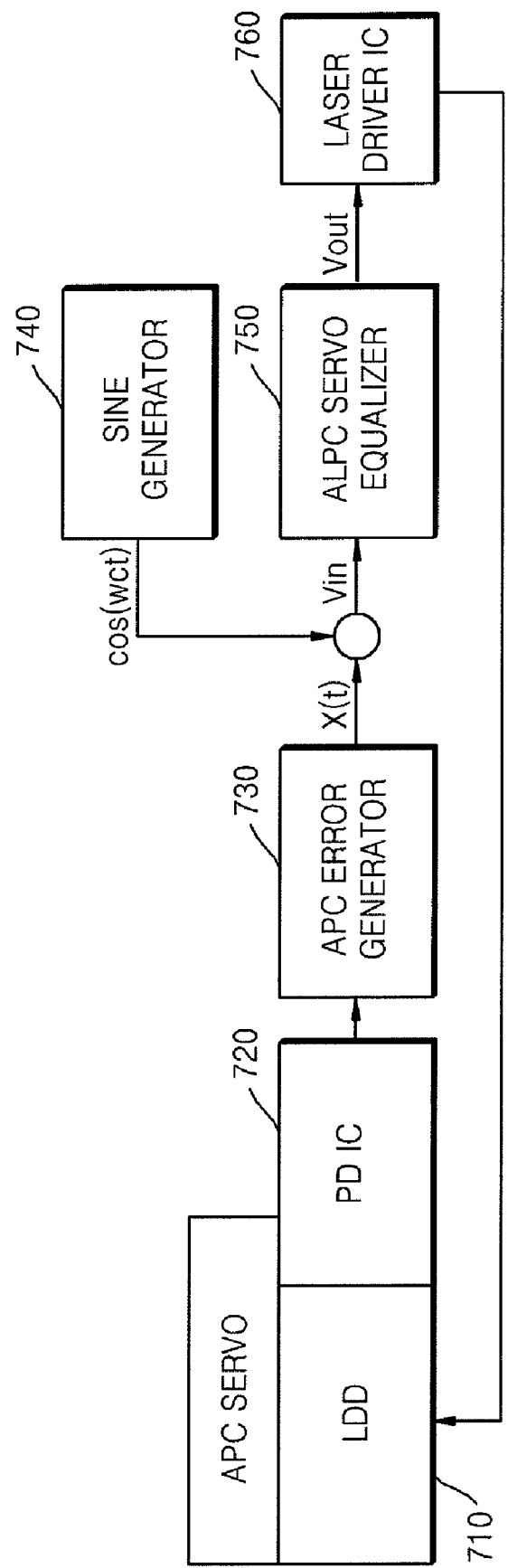
FIG. 7 shows a laser servo system according to an embodiment of the present invention.

FIG. 7 shows a laser output stable servo system usable in a recording/reproducing apparatus according to an embodiment of the present invention. A laser diode 710 is a light source for recording or reproducing information to and from an information recording medium. A laser driver 760 issues an intensity command to control the intensity of the light to record or reproduce information to/from a disc. A laser beam emitted from the laser diode 710 is converted by a collimator lens and splitter arrangement (not shown) to be converged for radiation to the disc. A reflected beam is converged by a lens to emit into a photodiode 720. A current outputted from the photodiode 720 is fed to error generator 730, wherein a comparison is made between the intensity value read from the photodiode 720 and a selected value, and the difference is output as the error signal X(t). A sign wave generator 740 generates the sine wave signal to be added to the error signal X(t) to form signal Vin to input to equalizer 750. The equalizer 750 performs equalization functions including amplification and square law operation as described in Equation 1 to 3. Vout is the equalized signal output to the laser driver 760 to complete the servo loop.

According to an alternative embodiment, a reduced-noise servo system of the present invention is used in connection with a memory refresh controller to increase performance in a memory (such as DRAM) system. The memory refresh controller detects the memory access conditions and adjusts the memory refresh rate using the reduced-noise servo system to optimize the operational speed of the memory system.

Figure 8:
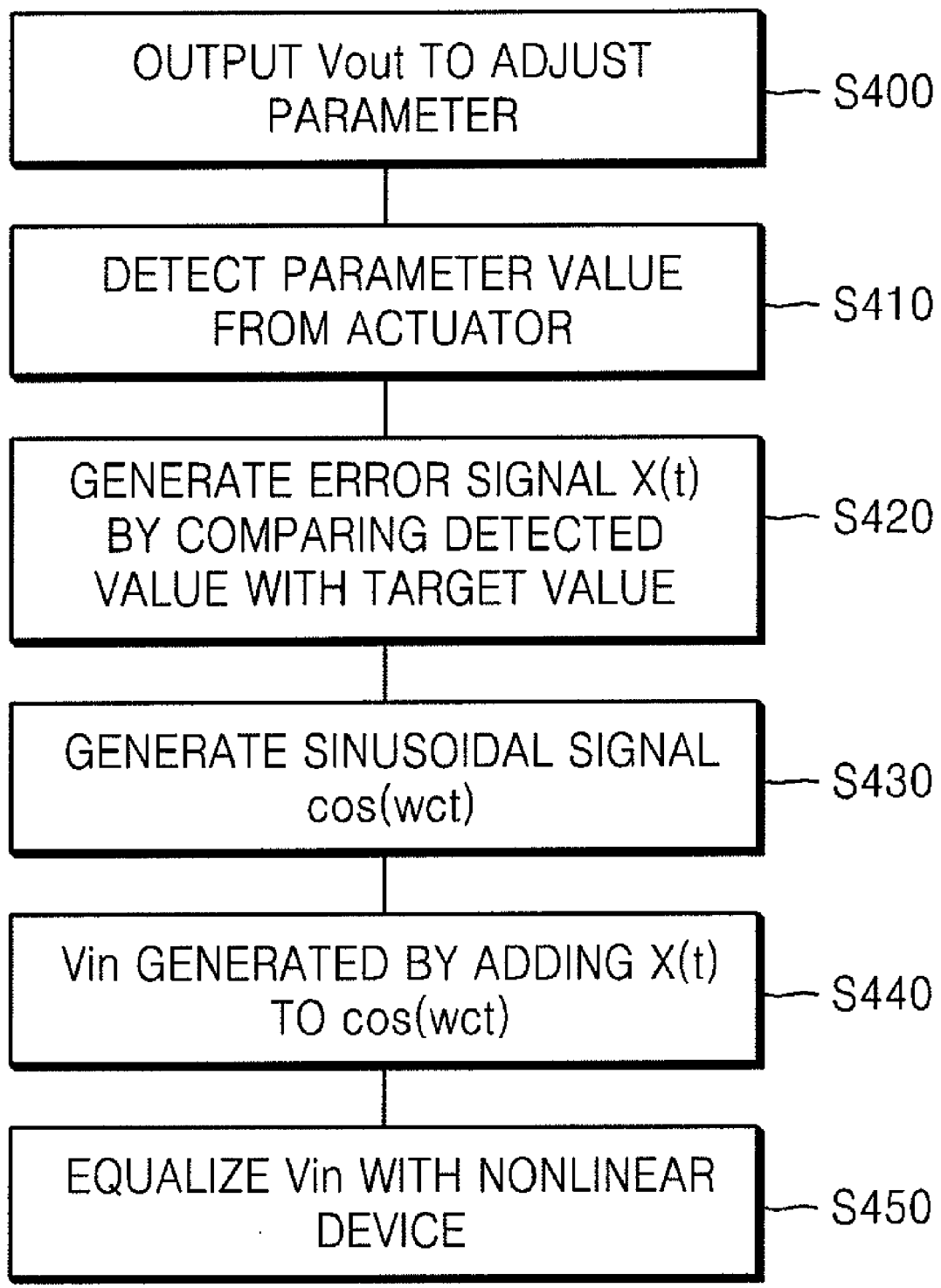
FIG. 8 shows a process flow of the operation of a servo system according to an embodiment of the present invention.

FIG. 8 shows a process flow of the operation of a servo system according to an embodiment of the present invention. A drive signal Vout is output to an actuator to effect adjustment of a parameter from a controller (S400). A detector detects the parameter upon adjustment by the Vout signal received at the actuator (S410). An error signal X(t) is generated by comparing the actual parameter value read by the detector and the target parameter value (S420). A carrier wave, sine or $\cos(w_c t)$, is generated at a carrier frequency well above that of the operating frequency of the actuator at a signal level well below the signal level of the detected parameter (S430). The carrier wave signal $\cos(w_c t)$ is added to the error signal X(t) by an adder to produce a Vin signal (S440) and Vin is output to the controller. Vin is processed by a square law (nonlinear) device to produce Vout, a reduced-noise version of Vin to complete the servo loop (S450).

Having described embodiments for a reduced noise servo control system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

The invention claimed is:

1. A servo control system, comprising:
   a controller outputting a parameter control signal;
   a device having a parameter controlled based on the parameter control signal;
   a sensing circuit sensing the parameter of the device and generating a parameter error signal;
   a sinusoidal signal generator generating a sinusoidal signal; and
   an adder adding the parameter error signal and the sinusoidal signal,
   wherein the controller includes a servo equalizer that equalizes the added parameter error signal and the sinusoidal signal to output an equalized parameter control signal to adjust the parameter.

2. The servo control system according to claim 1, wherein the parameter is one of position, laser power, tilt, velocity, acceleration, intensity, or duration.

3. The servo control system according to claim 1, wherein the device includes an actuator that adjusts the parameter.

4. The servo control system according to claim 3, wherein the actuator has a frequency response of 3 db cutoff below 10 Khz.

5. The servo system according to claim 1, wherein the sinusoidal signal is generated at a carrier frequency above 20 Khz and at a signal level below 150 mV.

6. The servo system according to claim 5, wherein the sinusoidal signal has a carrier frequency at about 40 Khz and at a signal level of about 100 mV.

7. The servo system according to claim 1, wherein the equalizer includes a transistor device to effect a square law operation on the combined parameter error signal and the sinusoidal signal.

8. The servo control system, according to claim 1, wherein the device is one of a CD-player, DVD-player, ROMROM, DVDROM, optical reader, or optical recorder.

9. The servo control system according to claim 1, wherein the device is an HDD and the parameter is position.

10. The servo control system according to claim 1, wherein the device is a memory system and the parameter is refresh rate.

11. The servo control system according to claim 1, wherein the device is a thermostat and the parameter is temperature.

12. A method of servo control, comprising:
    outputting at a controller a parameter control signal;
    adjusting a device using the parameter control signal;
    sensing the parameter value of the device;
    outputting an error signal representing parameter error;
    generating a sinusoidal signal;
    adding the error signal with the sinusoidal signal;
    inputting the added error and sinusoidal signal to the controller;
    equalizing the combined error and sinusoidal signal at the controller; and
    outputting the equalized signal as an adjusted parameter control signal.

13. The method according to claim 12, wherein the step of equalizing includes performing a square law operation on the combined error and sinusoidal signal.

14. The method according to claim 12, further including low pass filtering the equalized signal.

15. The method according to claim 12, wherein the sinusoidal signal is generated at a carrier frequency above 20 Khz and at a signal level below 150 mV.

16. The method according to claim 15, wherein the sinusoidal signal has a carrier frequency at about 40 Khz and at a signal level of about 100 mV.

17. The method according to claim 12, wherein the parameter control signal is used to control an optical pick up assembly of an optical disc player.

18. The method according to claim 12, wherein the parameter control signal is used to control a disc access assembly of an HDD.

19. The method according to claim 12, wherein the parameter control signal is used to control a spindle motor.

20. The method according to claim 12, wherein the parameter control signal is used to control a laser.

21. A servo control system for use in a data disc accessing device, comprising:

a controller outputting a positional control signal;
a disc reading device that reads data from a disc;
a tracking device that tracks the position of the disc reading device;
an error generator that generates an error signal representing the difference between a target position and the tracked position of the disc reading device;
a sinusoidal signal generator that generates a sinusoidal signal; and
an adder that adds the parameter error signal and the sinusoidal signal, wherein the controller includes a servo equalizer that equalizes the added error signal and the sinusoidal signal to output an equalized positional control signal to adjust the position of the disc reading device.

22. The servo control system of claim 21, wherein the equalizer includes a nonlinear device to provide a square-law effect to the added error signal and the sinusoidal signal.

23. The servo control system of claim 21, wherein the data disc accessing device is one of CD player, a CD recorder, a DVD player, a DVD recorder, or an HDD.

24. The servo control system of claim 21, wherein the data disc accessing device is a CD/DVD recorder configured to etch designs onto a CD/DVD disc.

25. The servo control system of claim 21, wherein the sinusoidal signal is generated at a carrier frequency above 20 Khz and at a signal level below 150 mV.

* * * * *